United States Patent [19]

Miyoshi et al.

[11] 4,255,314
[45] Mar. 10, 1981

[54] METHOD FOR THE MANUFACTURE OF A VINYL CHLORIDE COPOLYMER SOLUTION

[75] Inventors: Shigeto Miyoshi, Shibukawa; Toshio Kagami, Takasaki, both of Japan

[73] Assignee: Denki Kagaku Kogyo Kabushiki Kaisha, Tokyo, Japan

[21] Appl. No.: 57,152

[22] Filed: Jul. 12, 1979

[51] Int. Cl.³ .............................................. C08L 29/04
[52] U.S. Cl. ...................... 260/32.8 R; 260/33.6 UA; 260/34.2; 525/60; 525/62
[58] Field of Search .............. 525/62, 60; 260/32.8 R, 260/33.6 UA, 34.2

[56] References Cited

U.S. PATENT DOCUMENTS

| | | | |
|---|---|---|---|
| 2,512,726 | 6/1950 | Penn et al. | 525/60 |
| 3,573,265 | 3/1971 | Koral et al. | 525/62 |

*Primary Examiner*—Stanford M. Levin
*Attorney, Agent, or Firm*—Sughrue, Rothwell, Mion, Zinn & Macpeak

[57] ABSTRACT

In the manufacture of a vinyl chloride copolymer solution by dissolving in an organic solvent a vinyl chloride copolymer consisting of 50 to 90 wt % of vinyl chloride and 10 to 50 wt % of vinyl ester and having a mean polymerization degree of 100 to 800 and hydrolyzing the solution in the presence of alcohol, the viscosity of the hydrolyzed solution of the vinyl chloride copolymer is adjusted to 500 to 1000 CPS and the alcohol and the organic solvent are distilled at a temperature below 60° C. under a reduced pressure of 100 to 200 Torr and, when the alcohol content in the hydrolyzed solution becomes less than 0.5 wt %, the atmospheric pressure is restored.

9 Claims, No Drawings

METHOD FOR THE MANUFACTURE OF A VINYL CHLORIDE COPOLYMER SOLUTION

BACKGROUND OF THE INVENTION

1. Field of the Invention

This invention relates to a method for the manufacture of a vinyl chloride copolymer solution, and more particularly to a method for the manufacture of a solution of a vinyl chloride-vinyl ester-vinyl alcohol ternary copolymer wherein a vinyl chloride-vinyl ester copolymer is hydrolyzed with an acid or alkali in the presence of alcohol and then the alcohol content is reduced to less than 0.5 wt%.

2. Description of the Prior Art

Heretofore, there has been known a ternary copolymer consisting of vinyl chloride, vinyl ester and vinyl alcohol. This ternary copolymer is usually manufactured by a method in which a vinyl chloride-vinyl ester copolymer is supended in alcohol and hydrolyzed with an acid or alkali and then the alcohol is removed by filtering it from the hydrolyzed product, or a method in which the vinyl chloride-vinyl ester copolymer is dissolved in an organic solvent, alcohol is added thereto, hydrolyzation is carried out with an acid or alkali and then a solvent is added to precipitate the hydrolyzed product. In the case where the hydrolyzed product obtained by such a method is used as a paint, adhesive, ink or the like, however, it must be disolved again in an organic solvent before use; therefore, it would be convenient if the ternary copolymer can be used as it is without involving any other complicated steps. But the ternary copolymer contains a large quantity of alcohol, so that when the copolymer is mixed, for example, in an urethane resin, the latter reacts with the alcohol to destroy such features of the ternary copolymer as solvent resistance, adhesiveness, softness and luster afforded by its three-dimensional structure; therefore, removal of the alcohol is desired.

SUMMARY OF THE INVENTION

The present invention is to provide a method for the manufacture of a solution of a vinyl chloride-vinyl ester-vinyl alcohol ternary copolymer in which the viscosity of a copolymer hydrolyzed solution is adjusted and then alcohol contained in the solution is removed therefrom, for example, by heating the solution under reduced pressure.

Briefly stated, according to this invention, in the manufacture of a vinyl chloride copolymer solution by dissolving in an organic solvent a vinyl chloride copolymer consisting of 50 to 90 wt% of vinyl chloride, and 10 to 50 wt% of vinyl ester and having a mean polymerization degree of 100 to 800 and by hydrolyzing the copolymer in the presence of alcohol, the viscosity of the hydrolyzed solution is adjusted to 500 to 1000 CPS and pressure is reduced to 100 to 200 Torr at a temperature below 60° C. to distil the alcohol and the organic solvent and then atmospheric pressure is restored when the alcohol content in the hydrolyzed solution becomes less than 0.5 wt%.

DESCRIPTION OF THE PREFERRED EMBODIMENTS

A detailed description will hereinafter be given of the method of this invention for the manufacture of a vinyl chloride copolymer solution.

The manufacturing procedure starts with dissolving in an organic solvent a vinyl chloride-vinyl ester copolymer consisting of 50 to 90 wt% of vinyl chloride and 10 to 50 wt% of vinyl ester and having a mean polymerization degree of 100 to 800. It is desirable that the organic solvent is of the same type as a solvent in use in a point, adhesive, ink or the like in which the copolymer will ultimately be employed. The solvent usually employed in such a final product includes esters, ketones, aromatic hydrocarbon, fatty hydrocarbon or their chlorides, alicyclic compounds, or their mixtures; in short, the solvent may be any one of those solvents capable of dissolving the vinyl chloride-vinyl ester copolymer which has a boiling point higher than methanol. After dissolving the vinyl chloride-vinyl ester copolymer in such an organic solvent, alcohol is added to the solution and then hydrolysis is achieved through utilization of an acid or alkali. The acid employed for the hydrolysis reaction include inorganic acids such as hydrochloric acid, sulfuric acid, etc. and the alkali includes inorganic base such as caustic soda, caustic potash, etc. and alkali salts such as sodium carbonate and so forth. The abovesaid alcohol is preferably methanol because it is inexpensive and easy to remove. In order to facilitate the hydrolysis, the solution to be hydrolyzed contains the copolymer in the ratio of 50 to 100 wt% with respect to the organic solvent, is made homogeneous and then the hydrolysis reaction is carried out with or without heat. The temperature and viscosity of the solution during hydrolysis can be selected according to the performance of the hydrolysis process. After being hydrolyzed, the solution is composed of a hydrolyzed product, unreacted alcohol and the organic solvent.

No particular limitation is imposed on the vinyl ester utilized in the present invention and it may be, for example, vinyl propionate, vinyl versatate, vinyl acetate or the like; but vinyl acetate is preferred from the viewpoint of its physical properties. The alcohol in the hydrolyzed solution is removed therefrom together with the organic solvent by heating under reduced pressure. In the case where the concentration of the hydrolyzed product in the solution and the viscosity of the solution are both high, the organic solvent may sometimes foam or overflow during the dealcoholizing process, making it difficult and time-consuming to remove alcohol and, at the same time, impairing thermal stability of the hydrolyzed product.

Since the viscosity of the copolymer solution varies with the concentration of the solid hydrolyzed product in the copolymer solution, the composition of the copolymer and the hydrolysis treatment condition, it is generally preferred to achieve the dealcoholization under heated conditions. In this case, the viscosity of the copolymer solution during dealcoholizing is important and the alcohol can efficiently be removed in a relatively short time by adjusting the viscosity with an organic solvent to be in the range of 500 to 1000 CPS at the temperature for the removal of alcohol.

With such adjustment of the viscosity of the copolymer solution, the organic solvent does not foam, nor does it overflow during the dealcoholizing process.

Accordingly, though differing with its polymerization degree and composition, the vinyl chloride-vinyl ester copolymer is diluted with the organic solvent so that the amount of the former is usually less than 30 wt%, preferably less than 25 wt% relative to the latter.

The alcohol may be removed directly from a vessel used for hydrolysis under reduced pressure; but it is also possible to employ a thin film evaporating machine such as a film evaporator.

The dealcoholization is achieved so that the ultimate alcohol content in the solution of the hydrolyzed product is less than 1 wt%, preferably less than 0.5 wt%. The concentration and viscosity of the final product are adjusted with a suitable organic solvent according to individual use.

As described above, according to this invention, the alcohol content of a vinyl chloride-vinyl ester-vinyl alcohol ternary copolymer solution, which is produced by hydrolyzing a vinyl chloride-vinyl ester copolymer in the presence of alcohol, is made less than 0.5 wt%; in this case, the viscosity of the ternary copolymer solution is adjusted with an organic solvent to be 500 to 1000 CPS at temperature below 60° C. and then the ternary copolymer solution is dealcoholized in known manner. Such viscosity adjustment facilitates separation of the copolymer solution from the dealcoholizing implement, which has been difficult in the past due to foaming of the organic solvent, and efficiently provides a copolymer solution of excellent thermal stability and of small alcohol content.

The present invention will hereinbelow be described in more detail with respect to its examples.

EXAMPLE 1

100 weight parts of copolymer consisting of 80 wt% of vinyl chloride and 20 wt% of vinyl acetate and having a mean polymerization degree of 400, 180 weight parts of methylisobutyl ketone, 60 weight parts of toluene, 69 weight parts of methanol and 8 weight parts of hydrochloric acid were charged in a hydrolyzing can and hydrolyzed at a temperture in the range of 40° to 60° C. The viscosity of this solution was 960 CPS at 55° C. At this temperature, methanol was removed under a reduced pressure of 100 to 200 Torr. In this case, other solvents were also removed together with methanol; and during removal of methanol under reduced pressure, the solvents were distilled without foaming. When the amount of solvents distilled reached 40 to 50 wt% relative to the entire amount of solvents, the removal of solvents was stopped. At this time, the methanol content in the solution was 0.5 wt%. By adding to the solution 30 weight parts of methylisobutyl ketone and 70 weight parts of toluene, the amount of copolymer solidified was 25 to 30 wt% and the methanol content was 0.1 wt%.

EXAMPLE 2

The hydrolyzed copolymer solution obtained in Example 1 was introduced into a thin film evaporator and heated to 40° to 60° C. and passed at a rate of 10 kg/min. under a diminished pressure of 100 to 200 Torr. The amount of copolymer solidified was 30 to 35 wt% and its methanol content was 0.1 wt%.

It will be apparent that many modifications and variations may be effected without departing from the scope of the novel concepts of this invention.

What is claimed is:

1. A method for the manufacture of a vinyl chloride copolymer solution in which a vinyl chloride copolymer consisting of 50 to 90 wt% of vinyl chloride and 10 to 50 wt% of vinyl ester and having a mean polymerization degree of 100 to 800 is dissolved in an organic solvent and hydrolyzed in the presence of alcohol to obtain the vinyl chloride copolymer solution, characterized in that with the viscosity of the hydrolyzed solution of the vinyl chloride copolymer at 500 to 1000 CPS, the pressure is reduced to 100 to 200 Torr at a temperature below 60° C. to distil the alcohol and the organic solvent and then the pressure is increased to atmospheric pressure when the alcohol content in the hydrolyzed solution becomes less than 0.5 wt%.

2. A method for the manufacture of a vinyl chloride copolymer solution according to claim 1, wherein the vinyl chloride copolymer consists of 85 to 65 wt% of vinyl chloride and 15 to 35 wt% of vinyl acetate.

3. A method for the manufacture of a vinyl chloride copolymer solution according to claim 1, wherein the vinyl chloride copolymer has a mean polymerization degree of 300 to 500.

4. A method for the manufacture of a vinyl chloride copolymer solution according to claim 2, wherein the vinyl chloride copolymer has a mean polymerization degree of 300 to 500.

5. A method for the manufacture of a vinyl chloride copolymer solution according to claim 1, wherein the organic solvent has a boiling point higher than that of the alcohol.

6. A method for the manufacture of a vinyl chloride copolymer solution according to claim 1, wherein the alcohol is methanol.

7. A method for the manufacture of a vinyl chloride copolymer solution according to claim 1, wherein the organic solvent is methyl ethyl ketone, methyl isobutyl ketone, toluene, xylene or a mixture thereof.

8. A method for the manufacture of a vinyl chloride copolymer solution according to claim 4, wherein the alcohol is methanol, wherein the organic solvent is a mixture of methyl isobutyl ketone and toluene, wherein after the solution is hydrolyzed, its viscosity is adjusted to 500 to 1000 CPS by addition of organic solvent, and wherein under a reduced pressure of 100 to 200 Torr the solution is heated to 60° C. to distil the methanol without foaming of the organic solvent so that the methanol content in the hydrolyzed solution is less than 0.5 wt%.

9. A method for the manufacture of a vinyl chloride copolymer solution according to claim 1 wherein the 500 to 1000 CPS viscosity is obtained by addition of the organic solvent to the solution.

* * * * *